No. 835,354. PATENTED NOV. 6, 1906.
R. FLEMING.
SYSTEM OF ELECTRICAL DISTRIBUTION.
APPLICATION FILED OCT. 13, 1905.
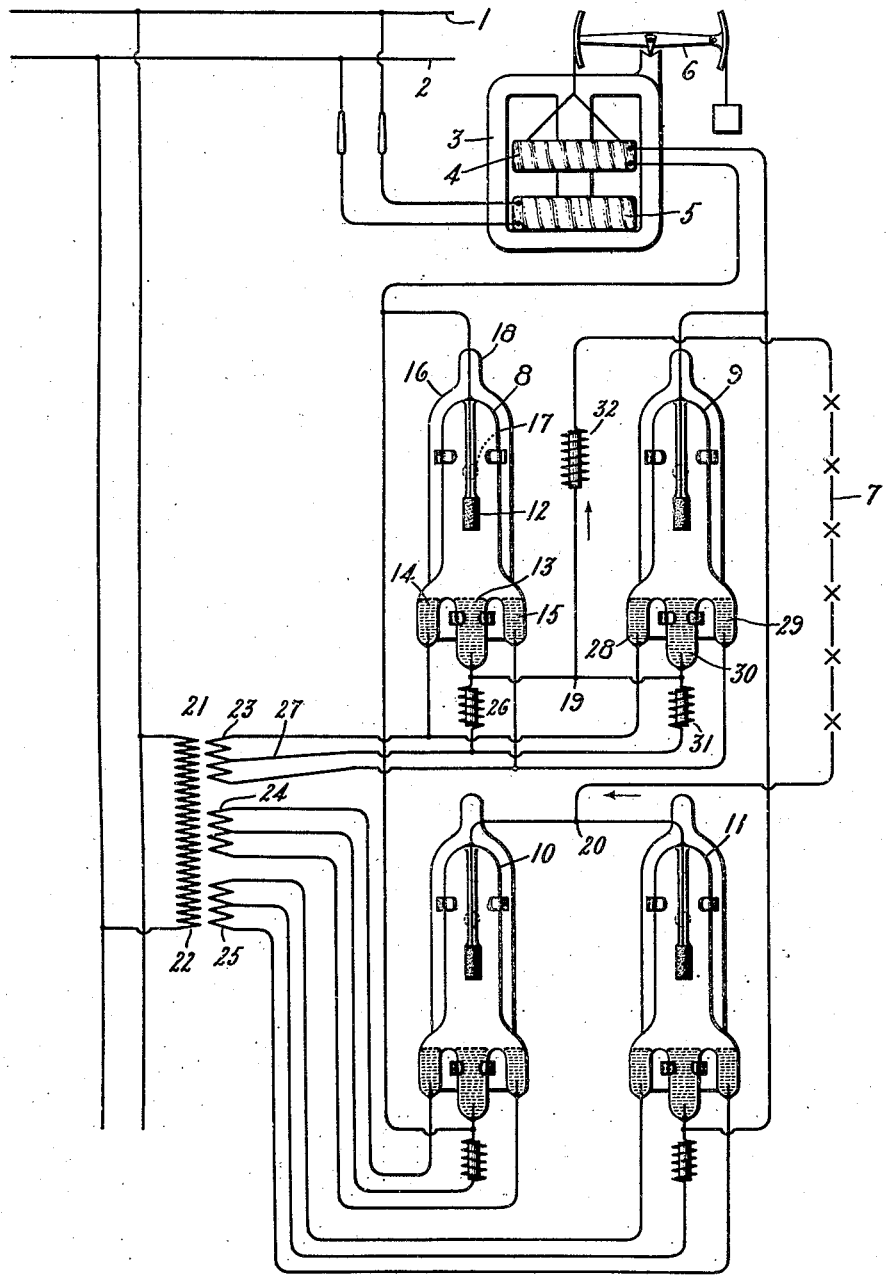
Witnesses:
George W. Tilden.
Inventor:
Richard Fleming,
by Albert G. Davis
Att'y.

UNITED STATES PATENT OFFICE.

RICHARD FLEMING, OF LYNN, MASSACHUSETTS, ASSIGNOR TO GENERAL ELECTRIC COMPANY, A CORPORATION OF NEW YORK.

SYSTEM OF ELECTRICAL DISTRIBUTION.

No. 835,354.  Specification of Letters Patent.  Patented Nov. 6, 1906.

Application filed October 13, 1905. Serial No. 282,582.

*To all whom it may concern:*

Be it known that I, RICHARD FLEMING, a citizen of the United States, residing at Lynn, county of Essex, State of Massachusetts, have invented certain new and useful Improvements in Systems of Electrical Distribution, of which the following is a specification.

The invention hereinafter set forth relates to electrical distribution systems, and more particularly to that type in which alternating current is converted into direct current and fed to suitable current-consuming devices.

The features of novelty which characterize my invention are pointed out with particularity in the appended claims.

The invention itself will be better understood by reference to the following description, taken in connection with the accompanying drawing, which represents diagrammatically one embodiment of my invention.

In the drawing the source of constant-potential alternating current is represented conventionally by the supply-mains 1 and 2. In order to transform current from these mains into a constant current, or, in other words, a current having a constant value, a constant-current-transforming device may be employed. As illustrative of such a device a constant-current transformer is represented at 3. The movable coil of this transformer, in the present instance the secondary coil, is indicated at 4, while the stationary primary coil is indicated at 5. The lever or counterbalance-arm by which the weight of the movable coil 4 is partially counterbalanced is indicated at 6.

The current from the secondary 4 of the constant-current transformer is fed to a rectifying system, whereby it is converted into direct current, and is then supplied to the series consumption-circuit 7, containing arc-lamps or other translating devices. The rectifying system consists in the present instance of four single-phase vapor rectifiers 8, 9, 10, and 11. The rectifiers are all alike, so that a description of one will suffice for all. Referring then to the rectifier 8, the same will be seen to consist of the rectifier-tube having a solid electrode or anode 12, a cathode 13, of mercury, and auxiliary anodes 14 and 15. The tube inclosing these electrodes is highly exhausted, as is well understood in the art, and the whole apparatus is mounted upon a tilting support 16, pivoted about its center of gravity, as at 17. A handle 18 permits the apparatus to be tilted so as to cause an overflow of mercury between the electrodes 13, 14, and 15 in order to start the same to operation.

The four rectifiers are connected in two parallel circuits across the supply-mains leading from the secondary 4. One of these parallel circuits or shunts from the supply-mains includes the rectifiers 8 and 9, while the other includes the rectifiers 10 and 11. In the case of the rectifiers 8 and 9 their positive terminals are connected, respectively, to the supply-mains and their negative terminals joined together, as at 19. The reverse arrangement is made in the case of the rectifiers 10 and 11. In this case the negative electrodes of the rectifiers are connected, respectively, to the supply-mains from the secondary 4, while their positive electrodes or terminals are joined together at 20. The consumption-circuit 7 is connected across the points 19 and 20. By reference to the arrows marked on the drawings it will be evident that current will flow, in the case of one wave, down through the rectifier 8, through the consumption-circuit 7, and return to the other supply-main through the rectifier 11. The next wave of current will pass down through the rectifier 9, then in the same direction as before through the consumption-circuit 7, and will return to the source through the rectifier 10.

The rectifiers which I have indicated require for their operation the existence of maintaining-arcs in each envelop. In the case of the rectifier 8 these maintaining-arcs are produced by supplying current to the auxiliary electrodes 14 and 15 and the common cathode 13. This current is supplied from an exciting-transformer 21, fed, like the system itself, from the source 1 2. The primary winding of this transformer is indicated at 22 and is provided, as indicated, with three secondaries 23, 24, and 25. The secondary 23 has its terminals connected to the auxiliary electrodes 14 and 15, before mentioned. The negative electrode 13 is connected, through an inductance-coil 26, to a conductor 27, extending from the middle point of the secondary 23. In a similar manner the auxiliary maintaining-electrodes 28 and 29 of the rectifier 9 are connected to the same secondary 23, while the corresponding cathode 30 is connected, through an inductance-coil 31, to the same lead 27. The secondary 23 thus supplies the exciting-currents for the rectifiers 8 and 9 and maintains these exciting-currents at all times when it is desired that the rectifiers should operate. The presence of these exciting-arcs renders the respective rectifiers pervious only to current-waves which tend to flow from anode to cathode. Similarly, in the case of the rectifiers 10 and 11 the secondaries 24 and 25 are respectively connected, the one to the maintaining-electrodes of the rectifier 10 and the other to the maintaining-electrodes of the rectifier 11, and thus render the said rectifiers conductive for current-waves of one direction only.

In order to start the apparatus into operation, the rectifiers may be successively started up by shaking or tilting each one in turn to produce the starting and maintaining arcs. The supply-circuits for the constant current may then be closed, and current will then pass through the rectifying system to load. An inductance-coil 32 in the load-circuit serves to smooth out the current and steady the action of the system.

What I claim as new, and desire to secure by Letters Patent of the United States, is—

1. The combination of a source of alternating current, a constant-current transformer having relatively movable coils, a secondary circuit extending from said transformer, four vapor rectifiers connected in pairs across the secondary supply-mains, a work-circuit having one terminal connected between two of the rectifiers of one pair, and the other terminal between two of the rectifiers of the other pair, a transformer fed from said supply-circuit, and having a plurality of secondaries, auxiliary arc-maintaining electrodes for each rectifier, and connections between each transformer-secondary and the arc-maintaining electrodes of one of the rectifiers.

2. The combination of a source of alternating current, an alternating-current circuit fed therefrom, means for maintaining constancy of current in said circuit, four vapor rectifiers connected in pairs across said circuit, a work-circuit having one terminal connected between two of the rectifiers of one pair and the other terminal between the two rectifiers of the other pair, arc-maintaining circuits for each rectifier, and means for supplying all of said arc-maintaining circuits with current from the same source as that supplying the rectifiers.

In witness whereof I have hereunto set my hand this 11th day of October, 1905.

RICHARD FLEMING.

Witnesses:
 JOHN A. McMANUS, Jr.,
 HENRY O. WESTENDARP.